US008850601B2

(12) United States Patent
Piwonka et al.

(10) Patent No.: US 8,850,601 B2
(45) Date of Patent: Sep. 30, 2014

(54) SYSTEMS AND METHODS OF DETERMINING A TRUST LEVEL FROM SYSTEM MANAGEMENT MODE

(75) Inventors: Mark A. Piwonka, Tomball, TX (US); Bernard D. Desselle, Spring, TX (US); Louis B. Hobson, Tomball, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 0 days.

(21) Appl. No.: 13/260,308

(22) PCT Filed: May 18, 2009

(86) PCT No.: PCT/US2009/044309
§ 371 (c)(1),
(2), (4) Date: Sep. 24, 2011

(87) PCT Pub. No.: WO2010/134902
PCT Pub. Date: Nov. 25, 2010

(65) Prior Publication Data
US 2012/0017285 A1    Jan. 19, 2012

(51) Int. Cl.
*G06F 21/31* (2013.01)
*G06F 21/57* (2013.01)
*G06F 21/52* (2013.01)

(52) U.S. Cl.
CPC ............... *G06F 21/57* (2013.01); *G06F 21/52* (2013.01)
USPC .......................................................... 726/27

(58) Field of Classification Search
CPC .................................. G06F 21/57; G06F 21/52
USPC ........................................................... 726/27
See application file for complete search history.

(56) References Cited

U.S. PATENT DOCUMENTS

| | | | |
|---|---|---|---|
| 5,944,821 A * | 8/1999 | Angelo | 726/22 |
| 6,243,809 B1 | 6/2001 | Gibbons et al. | |
| 7,073,059 B2 * | 7/2006 | Worely et al. | 713/168 |
| 7,200,761 B1 * | 4/2007 | Freeman et al. | 713/184 |
| 7,222,062 B2 | 5/2007 | Goud et al. | |
| 7,418,584 B1 * | 8/2008 | Klaiber et al. | 712/229 |
| 7,496,966 B1 * | 2/2009 | McGrath et al. | 726/27 |
| 8,316,414 B2 * | 11/2012 | Datta et al. | 726/1 |
| 2002/0169979 A1 | 11/2002 | Zimmer | |
| 2003/0037244 A1 * | 2/2003 | Goodman et al. | 713/189 |
| 2003/0229794 A1 * | 12/2003 | Sutton et al. | 713/189 |
| 2005/0114687 A1 * | 5/2005 | Zimmer et al. | 713/193 |

(Continued)

FOREIGN PATENT DOCUMENTS

| | | |
|---|---|---|
| CN | 1228177 A | 9/1999 |
| WO | WO-01/42874 | 6/2001 |

OTHER PUBLICATIONS

ISA/KR, International Search Report dated Feb. 1, 2010, PCT/US2009/044309 filed May 18, 2009.

(Continued)

*Primary Examiner* — Techane Gergiso (57) ABSTRACT

Systems and methods of determining a trust level from system management mode are disclosed. One such method includes: responsive to a system management mode interrupt (SMI), determining a trust level associated with code invoking the SMI; and responsive to determining that the trust level is untrusted, granting or denying a request made by the code invoking the SMI based at least in part on a type of the request.

11 Claims, 8 Drawing Sheets

(56) References Cited

U.S. PATENT DOCUMENTS

| | | |
|---|---|---|
| 2005/0138370 A1* | 6/2005 | Goud et al. .................... 713/164 |
| 2005/0210467 A1 | 9/2005 | Zimmer et al. |
| 2005/0262571 A1* | 11/2005 | Zimmer et al. ................. 726/27 |
| 2006/0137008 A1* | 6/2006 | Maor .............................. 726/22 |
| 2007/0016766 A1* | 1/2007 | Richmond et al. ............ 713/100 |
| 2008/0115011 A1* | 5/2008 | Codrescu et al. ............... 714/38 |
| 2008/0134321 A1 | 6/2008 | Rajagopal |
| 2008/0163212 A1 | 7/2008 | Zimmer |
| 2009/0083532 A1* | 3/2009 | Brannock et al. ................. 713/1 |
| 2009/0113425 A1* | 4/2009 | Ports et al. ........................ 718/1 |
| 2009/0119748 A1* | 5/2009 | Yao et al. ........................... 726/2 |
| 2009/0320128 A1* | 12/2009 | Pant et al. ....................... 726/22 |
| 2010/0057982 A1* | 3/2010 | Barde ............................ 711/104 |
| 2010/0077199 A1* | 3/2010 | Hobson et al. ................ 713/100 |

OTHER PUBLICATIONS

Xu Yan-Ling et al., "Design and Implementation of Secure Embedded Systems Based on Trustzone," ICESS '08, Jul. 29, 2008, pp. 136-141, IEEE.

* cited by examiner

SYSTEMS AND METHODS OF DETERMINING A TRUST LEVEL FROM SYSTEM MANAGEMENT MODE

BACKGROUND

Today's personal computer (PC) systems may include a processor which supports a system management mode. This system management mode (SMM) has various uses: handling low-level system events like memory or chipset errors; system safety functions, such as shutdown on high processor temperature; power management operations, such as turning on fans; and emulation of unimplemented motherboard hardware (e.g., a USB mouse appears to be a PS/2 mouse). A more recent use of SMM is to control access to various security features. It is desirable to allow trusted software components to control security features through SMM and prevent untrusted software components from doing so, while still allowing untrusted software components to use SMM for other purposes.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure.

DETAILED DESCRIPTION

Figure 1:
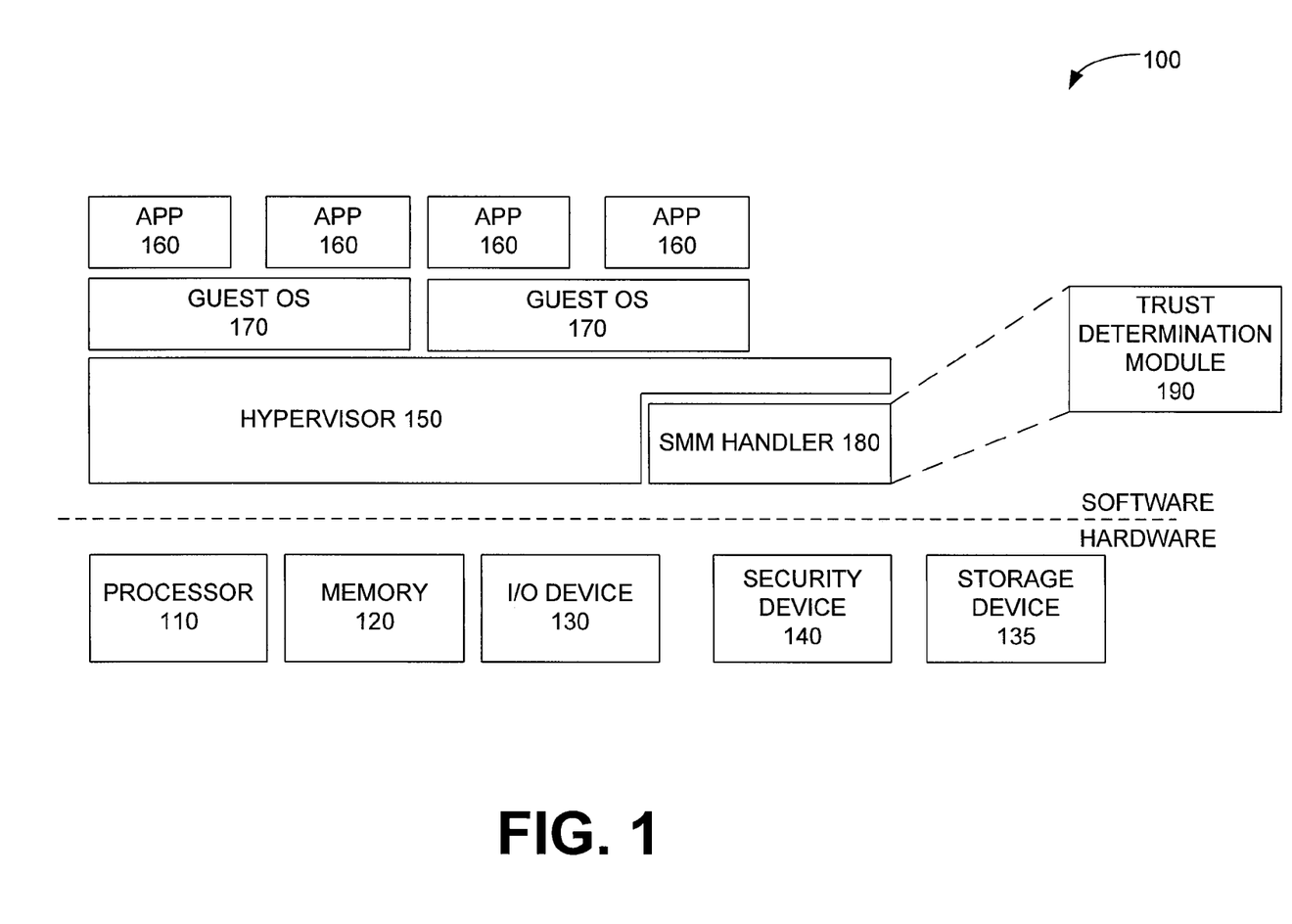
FIG. 1 is a system architecture diagram of a system which includes a module for securely invoking system management interrupts, according to some embodiments disclosed herein.

FIG. 1 is a system architecture diagram of a system which includes a module for determining a trust level from system management mode, according to some embodiments disclosed herein. System 100 includes hardware components and software components. As should be understood by a person of ordinary skill in the art, software components execute on a hardware platform; specifically, software components execute on a processor (e.g., microprocessor, network processor, microcontroller, digital signal processor, digital signal controller, application-specific instruction set processor, etc.) within the hardware platform. This executable code can be embodied in any computer-readable medium for use by or in connection with a processor. The hardware platform also typically includes hardware components other than the processor with which the software interacts (either directly or indirectly). These other hardware components can be implemented by various forms of specialized logic, such as a programmable logic device (PLD), programmable gate array (PGA), field programmable gate array (FPGA), an application-specific integrated circuit (ASIC), a system on chip (SoC), a system in package (SiP), etc.

As can be seen in FIG. 1, these various components can be viewed as having a layered arrangement. The bottom layer includes hardware components, which in this example system include: a processor 110; memory 120; and I/O devices 130 such as a storage device 135 (e.g., a hard disk, flash RAM, flash ROM, or EEPROM) and security device 140. Security device 140 (sometimes referred to as a trusted platform module or TPM), performs cryptographic functions and may be used to store cryptographic keys, digital certificates, and passwords.

Various software components are arranged in layers above the hardware layer. A hypervisor 150 software component is closest to the hardware, and is the only software component that is allowed unsupervised access to the hardware. Thus, applications 160 and guest operating systems 170 are considered untrusted components, and do not have direct access to hardware components 100-140. Instead, various architectural features of processor 110 allow hypervisor 150 to monitor or supervise the actions of applications 160 and guest operating systems 170, such that the execution of certain instructions, or access to certain memory or I/O locations, by these untrusted components causes hypervisor 150 to be invoked and take control. The supervisory features of hypervisor 150 are possible because processor 110 can execute in various privilege modes. In system 300, hypervisor 150 runs in the most privileged mode while applications 160 and guest operating systems 170 run in a less-privileged mode.

In addition to at least two privilege-related modes, processor 110 supports yet another mode known as system management mode (SMM). Invocation of SMM triggers execution of an associated system management mode handler 180. In system 100, one role of SMM handler 180 is to control access to security device 140. Trust determination module 190, part of SMM handler 180, allows the handler to determine whether the handler was invoked by a trusted component (e.g., hypervisor 150) or by an untrusted component (e.g., guest operating systems 170 or one of applications 160). SMM handler 180 then takes appropriate action, based on this determination.

In some embodiments, when SMM handler 180 was invoked by hypervisor 150 as a result of an attempted access to security device 140, module 190 physically accesses security device 140 on behalf of hypervisor 150. However, if SMM handler 180 was invoked by applications 160 or guest operating systems 170 as a result of an attempted access to security device 140, module 190 does not physically access security device 140, but instead virtualizes the access so that it appears to applications 160 or guest operating systems 170 that the access took place. Applications 160 or guest operating systems 170 can invoke SMM for reasons other than access to security device 140, and in some embodiments module 190 then insures that SMM handler 180 performs the requested action on behalf of the untrusted component.

More details about actions taken by trust determination module 190 will be discussed below in connection with FIGS. 3-5. The mechanism by which trust determination module 190 determines whether a trusted or untrusted component invoked SMM will now be discussed in connection with the block diagram of FIG. 2, which illustrates the SMM address space 200.

Figure 2:
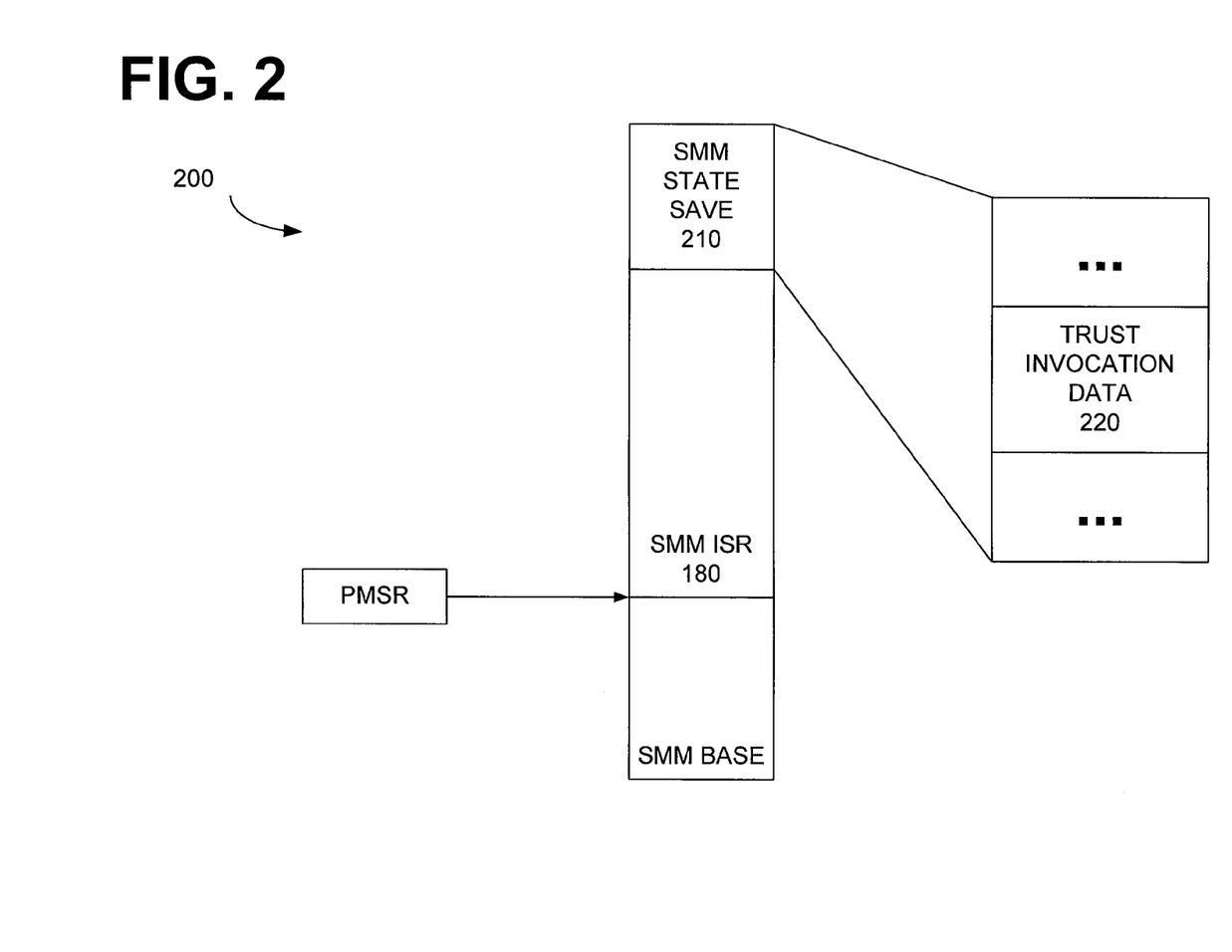
FIG. 2, which illustrates SMM address space.

When executing in SMM, processor 110 uses a dedicated, private address space 200, different than the address space used by either the most-privileged or less-privileged modes described above. Thus, SMM handler 180 resides in this address space, as does a SMM state save area 210. A register, which may be known as the processor model-specific register (PMSR), points to the location of SMM handler 180 within SMM address space 200. SMM state save area 210 starts at the top of address space 200 and grows down.

SMM is invoked only via a specific hardware interrupt, known as the system management interrupt (SMI). In response to an SMI, processor 110 saves state information to SMM state save area 210 and jumps to SMM handler 180. SMM state save area 210 includes various types of state information, such as registers and status information. According to the features disclosed herein, processor 110 also saves trust invocation data 220 before executing SMM handler 180 and trust determination module 190 (within handler 180) examines trust invocation data 220 to determine whether a trusted or an untrusted component was executing when the SMI occurred. Trust invocation data 220 can take various forms, such as a 1-bit value specifying trusted or untrusted, or a multi-bit value specifying privilege level (e.g., 0 to N, with levels below M being trusted). Persons of ordinary skill in the art should recognize that other ways of representing this data are also possible, and other implementations are intended to be within the scope of this disclosure. As mentioned above, some embodiments of trust determination module 190 permit access to security device 140 by trusted code, but deny or block access by untrusted code.

Notably, the saving of state information, including trust invocation data 220, is performed by processor 110 itself, not by software (i.e., not by instructions executing on processor 110). Persons of ordinary skill in the art should appreciate the fundamental distinctions between instructions executing on a processor and microcode within the processor. In some embodiments, processor 110 implements the state save through microcode. Other embodiments implement this action in specialized logic, and still other embodiments implement this action through a combination of microcode and specialized logic.

Figure 3:
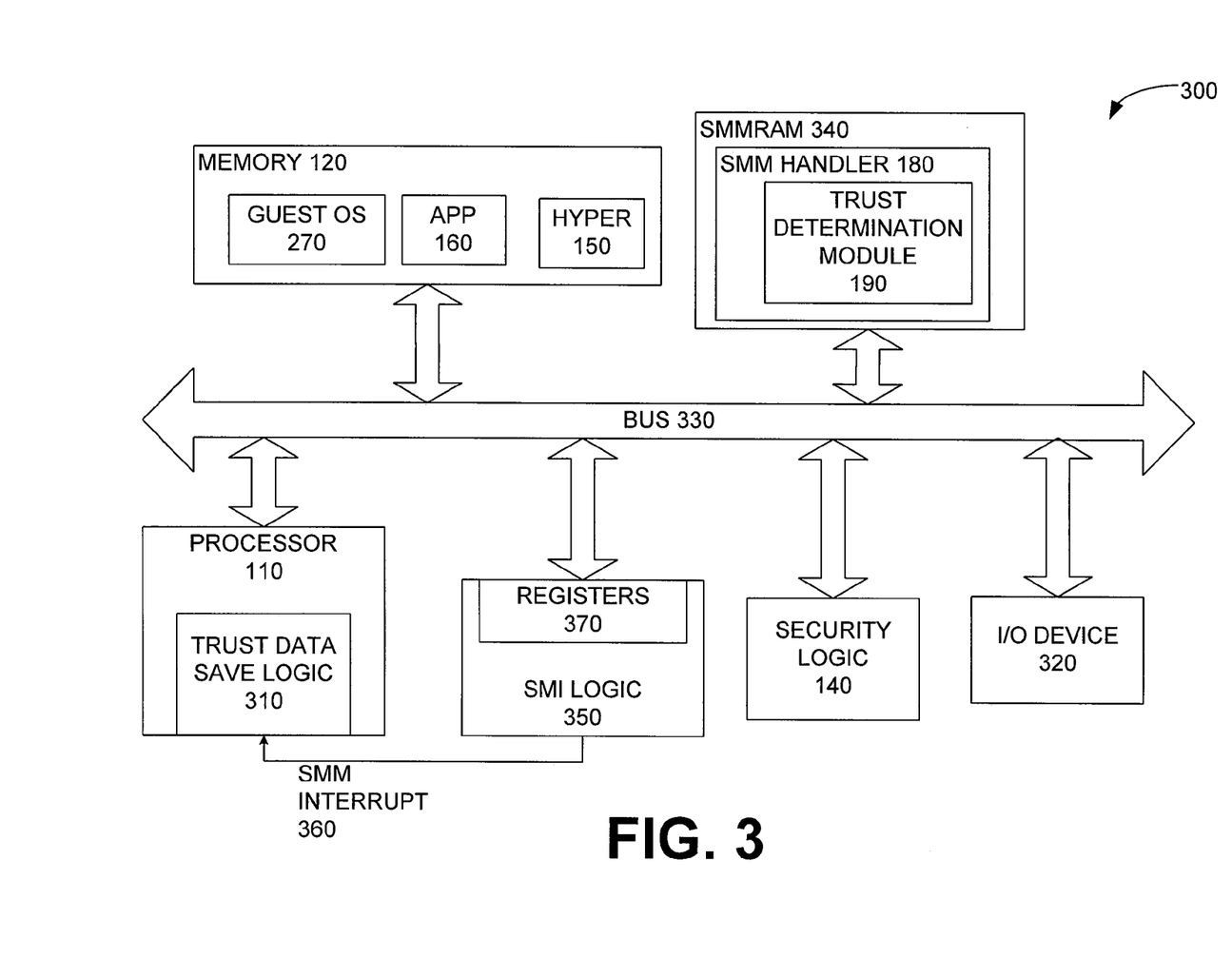
FIG. 3 is a block diagram of various components for a system which includes a module for securely invoking system management interrupts, according to some embodiments disclosed herein.

FIG. 3 is a block diagram of various components for a system which includes a module for determining a trust level from system management mode, according to some embodiments disclosed herein. System 300 includes processor 110, which includes a module for saving trust invocation data 310. Processor 110 which accesses I/O devices 320, security device 140, and memory 120 over bus 330. Memory 120 contains various portions of code that are executed by processor 110 (e.g., application 160, guest OS 170, hypervisor 150). SMM RAM 340 is memory mapped into the private address space described above for SMM. SMM RAM 340 also contains executable code, in particular SMM handler 180.

SMI logic 350 generates a system management interrupt (SMI) 360 which is provided as input to processor 110. As should be known to person of ordinary skill in the art, processor 110 enters SMM mode (described above) in response to receiving SMI 360. SMI logic 350 also includes various registers 370 which control operation of SMI 360. In some embodiments, one or more of these registers acts directly as an SMI control register: code views this as an SMI control register and performs an I/O write to the register in order to request an SMI. In some of these embodiments, one or more of registers 370 acts as a request or command register, such that code makes a specific type of request to be executed by SMM handler 180. Examples of such requests include requests to disable, enable, deactivate, and reset security device 140. Other examples include shutdown and standby requests to security device 140 or other devices. Thus, registers 370 can be viewed as a way to request SMM handler 180 to take a specific action, analogous to a software interrupt, even though the SMI is a hardware rather than software interrupt. In some of these embodiments, the SMM handler communicates with the caller by writing to an SMI status register and/or the saved state area of SMM RAM 340 and code (e.g., SMM handler 180) can query this register/memory location to discover the reason for the SMI.

In some embodiments, one or more of these registers acts indirectly as an SMI control register. In such cases, register 370 is mapped to a location of another I/O device (e.g. a keyboard controller register), such that code doesn't view the register 370 as an SMI control register. Nonetheless, SMI logic 350 may generate SMI 360 after some combination of reads and writes to registers 370, so the registers can ultimately function as an SMI control register.

Figure 4A:
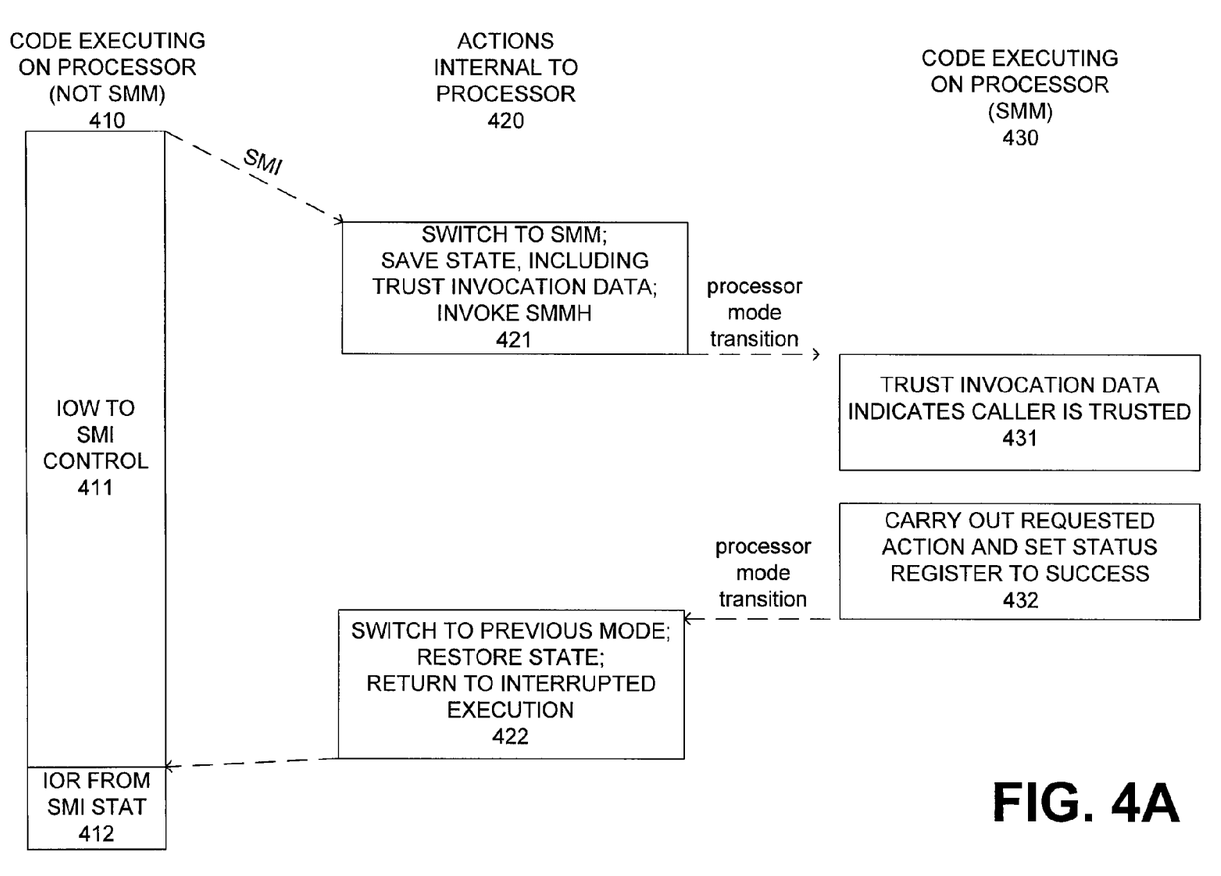
FIGS. 4A-C are sequence diagrams illustrating actions performed by some embodiments of a module for securely invoking system management interrupts, during various example scenarios of SMM invocation.
Figure 4B:
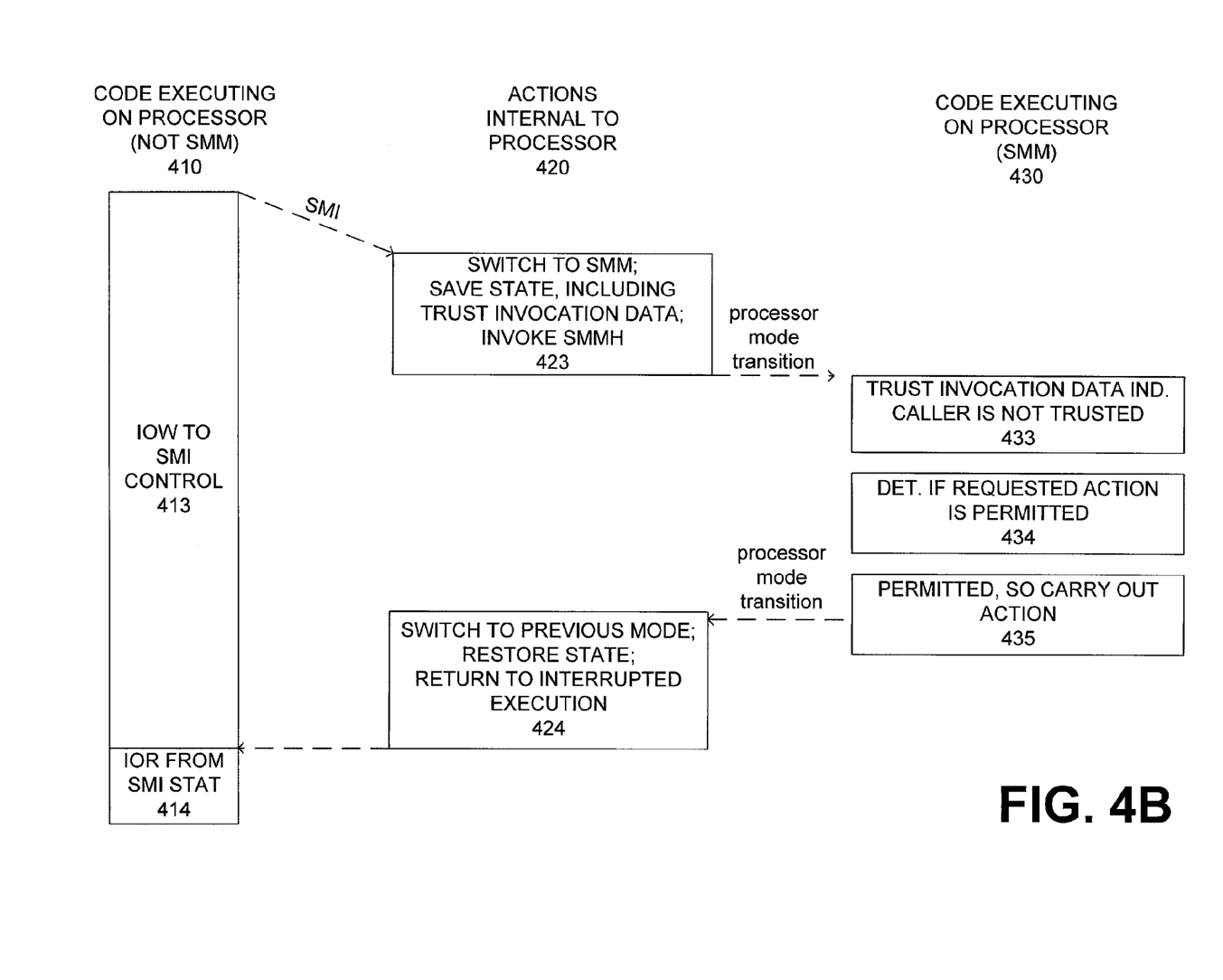
Figure 4C:
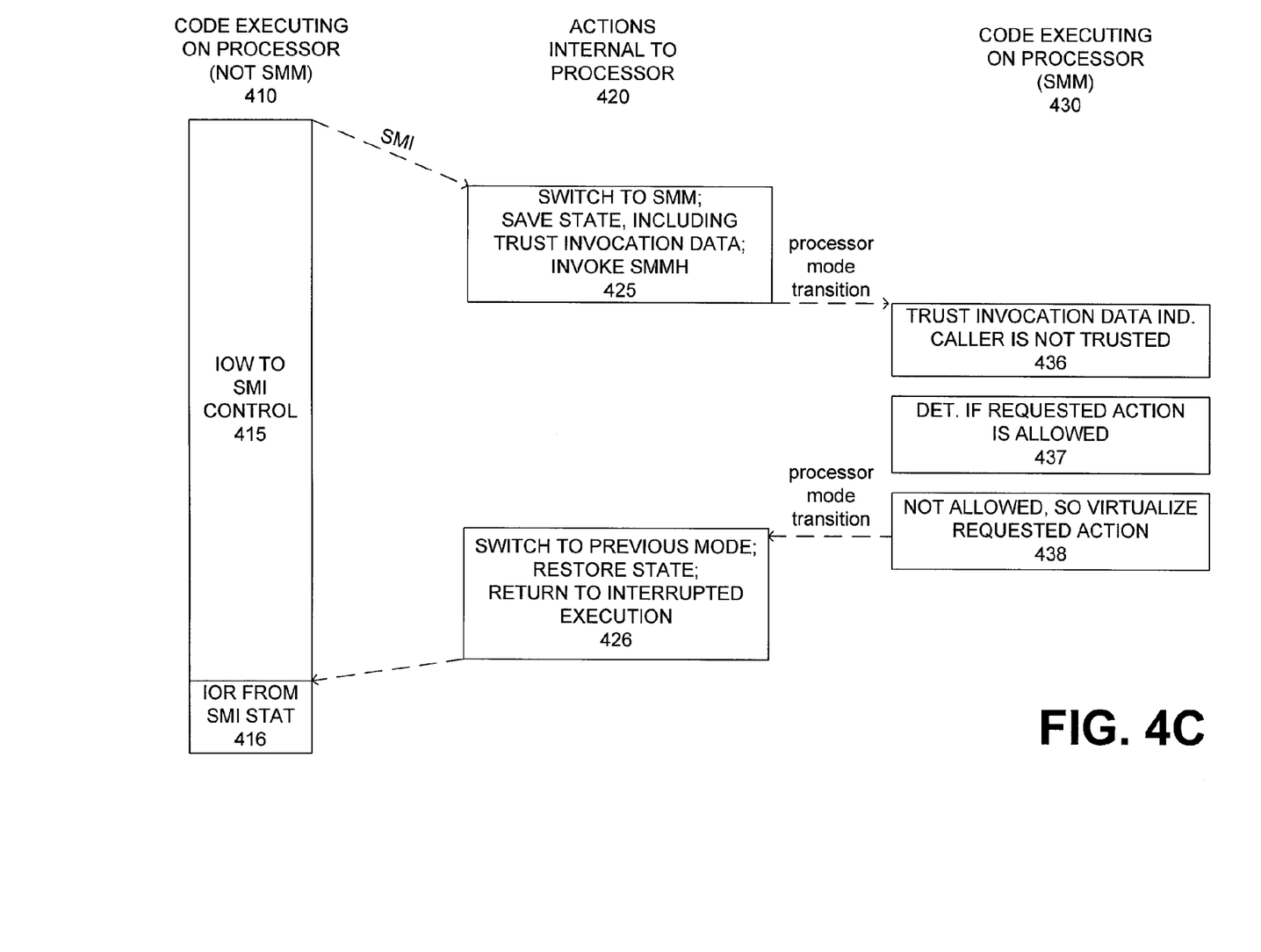

FIGS. 4A-C are sequence diagrams illustrating actions performed by some embodiments of a module for determining a trust level from system management mode, during various example scenarios of SMM invocation. Turning to FIG. 4A, these actions can be divided into three types: actions performed by code executing on processor 110 in a mode other than SMM (column 410); actions performed by processor 110 itself (column 420); and actions performed by code executing on processor 110 in SMM (column 430). The sequence begins with non-SMM code executing (411) an I/O write to an SMI control register. As described earlier in connection with FIG. 3, this I/O write triggers SMI 360. In response, processor 110 takes action (421) which involves: switching the processor mode to SMM; saving processor state, including trust invocation data 220; and invoking the SMM handler.

The SMM handler begins execution. At some point, the SMM handler examines (431) trust invocation data 220. In the example scenario of FIG. 4A, this data indicates the "caller" is trusted. (Although the invocation occurred through an interrupt rather than a call instruction, for simplicity the code executing at the time of the SMI will nonetheless be referred to as the "caller".) Since the caller is trusted, the SMM handler examines saved state data and/or registers within SMI logic 350 to determine what action the caller has requested, and carries out (432) the requested action. The SMM handler eventually returns, which in some embodiments utilizes a specialized instruction.

Upon return of the SMM handler, processor 110 takes action (422) which involves: switching to the previous (interrupted) processor mode; restoring processor state; and returning to the interrupted execution path (e.g., via the stack). The interrupted code executing in non-SMM mode continues (412) executing at the instruction following the one that invoked the SMI. In this example scenario, that next instruction is an I/O read of an SMI status register, by which the caller determines whether or the not the SMM handler carried out the requested action successfully.

FIG. 4B illustrates a different scenario of SMM invocation. The sequence begins with non-SMM code executing (413) an I/O write to an SMI control register, which triggers SMI 360. In response, processor 110 takes action (423) which involves: switching the processor mode to SMM; saving processor state, including trust invocation data 220; and invoking the SMM handler. The SMM handler begins execution. At some point, the SMM handler examines (433) trust invocation data 220. In this example scenario of FIG. 4B, this data indicates the caller is not trusted. In this embodiment, the SMM handler does carry out some requested actions on behalf or an untrusted caller, though not others. Therefore, the SMM handler determines (434) whether or not the requested action is permitted on behalf of untrusted callers. In some embodiments, read or write access to security device 140 is not permitted by untrusted callers, but other requests are honored.

In this example scenario of FIG. 4B, the requested action is permitted, so the SMM handler ensures that the requested action is carried out (435). The SMM handler may also communicate with the caller by writing to an SMI status register and/or the saved state area of SMMRAM. In some embodiments, the SMM handler carries out the requested action directly by issuing one or more instructions (e.g., I/O instructions). In other embodiments, the SMM handler does not carry out the requested action directly, but takes action which indirectly results in the requested action taking place, for example, saving a value in the SMM state save area 210 which causes the processor 110 to restart the instruction executed by the caller that resulting in invocation of the SMM hander.

The SMM handler eventually returns, and upon return of the SMM handler, processor 110 takes action (424) which involves: switching to the previous (interrupted) processor mode; restoring processor state; and returning to the interrupted execution path (e.g., via the stack). The interrupted code executing in non-SMM modes continues (414) executing at the instruction following the one that invoked the SMI. In this example scenario, that next instruction is an I/O read of an SMI status register, by which the caller determines whether or the not the SMM handler carried out the requested action successfully.

FIG. 4C illustrates yet another scenario of SMM invocation. The sequence begins with non-SMM code executing (415) an I/O write to an SMI control register, which triggers SMI 360. In response, processor 110 takes action (425) which involves: switching the processor mode to SMM; saving processor state, including trust invocation data 220; and invoking the SMM handler. The SMM handler then begins execution.

At some point, the SMM handler examines (436) trust invocation data 220. In this example scenario of FIG. 4C, this data indicates the caller is not trusted. In this embodiment, the SMM handler does carry out some requested actions on behalf or an untrusted caller, while blocking or denying other actions. Therefore, the SMM handler determines (437) whether or not the requested action is permitted on behalf of untrusted callers. In this example scenario of FIG. 4C, the requested action is a read or write to security device 140 (a device managed by SMM handler), which is not permitted. Therefore, the SMM handler does not carry out the requested action, but instead virtualizes (438) the access on that it appears to untrusted component that the requested access occurred. The SMM handler may also communicate with the call by writing to an SMI status register and/or the saved state area of SMMRAM. Other embodiments ignore an impermissible access instead of virtualizing it.

The SMM handler eventually returns, and upon return of the SMM handler, processor 110 takes action (426) which involves: switching to the previous (interrupted) processor mode; restoring processor state; and returning to the interrupted execution path (e.g., via the stack). The interrupted code executing in non-SMM mode continues (416) executing at the instruction following the one that invoked the SMI. In this example scenario, that next instruction is an I/O read of an SMI status register. As explained above, SMM handler virtualized the requested action, so the caller proceeds as if the requested action actually took place.

Figure 5:
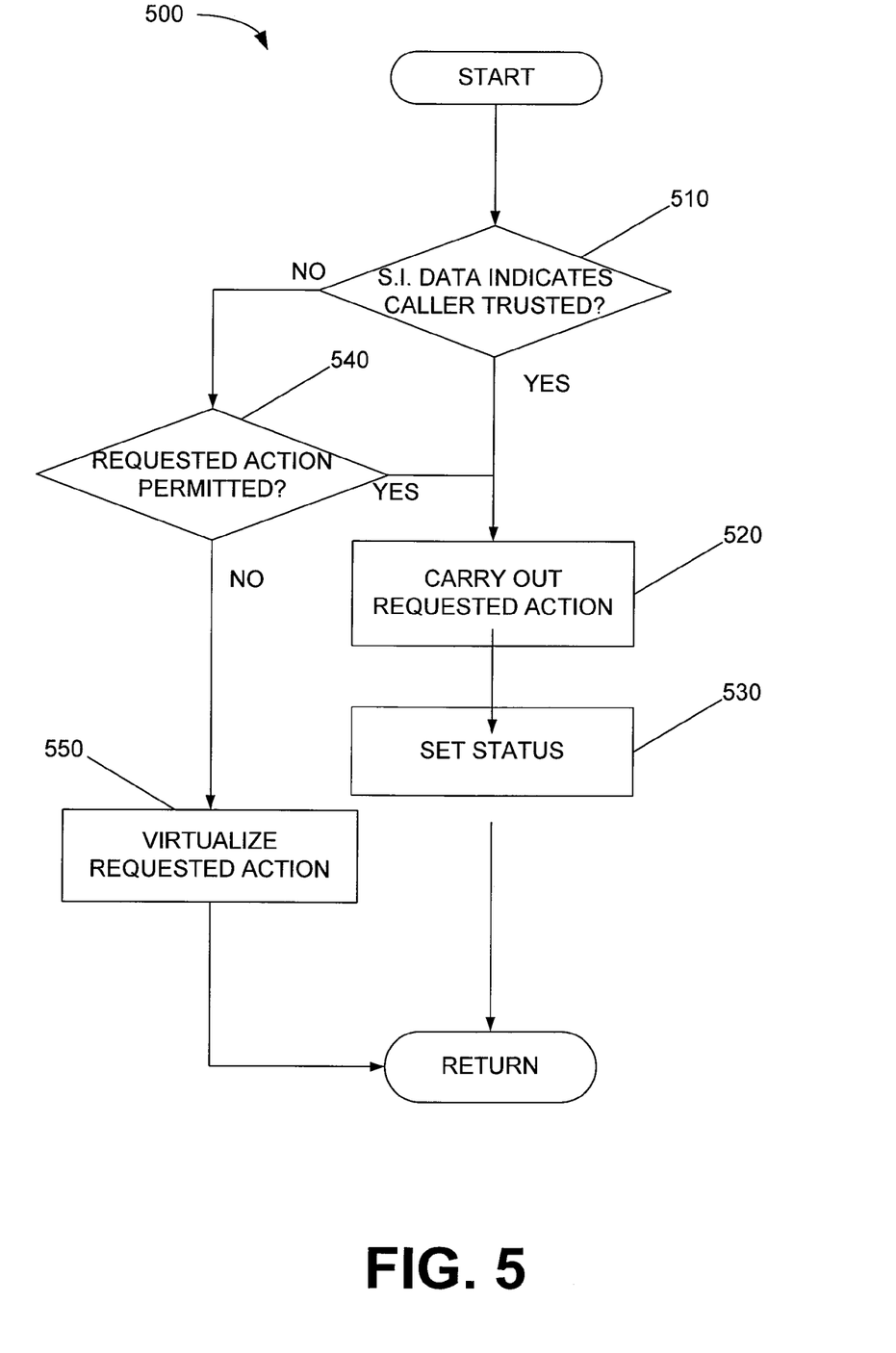
FIG. 5 is a flowchart illustrating operation of the trust invocation logic from FIG. 1, according to some embodiments.

FIG. 5 is a flowchart illustrating operation of trust determination module 190, according to some embodiments. Process 500 begins at block 510, where trust invocation data 220 (stored in SMMRAM) is examined to determine whether or not the caller is trusted. If the caller is trusted, then the requested action (as indication by trust invocation data 220 and/or SMI logic 350) is carried out at block 520, and status information is communicated to the caller (if appropriate) at block 530. Process 500 is then complete.

If the caller is not trusted, block 540 makes a determination as to whether the requested action is one that is permitted on behalf of an untrusted caller. If the action is permitted, processing continues as described above at blocks 520 and 530, and then processing is complete. If the requested action is not permitted, processing instead continues at block 550, where the requested action is virtualized so that it appears to untrusted component that the requested action was carried out.

Figure 6:
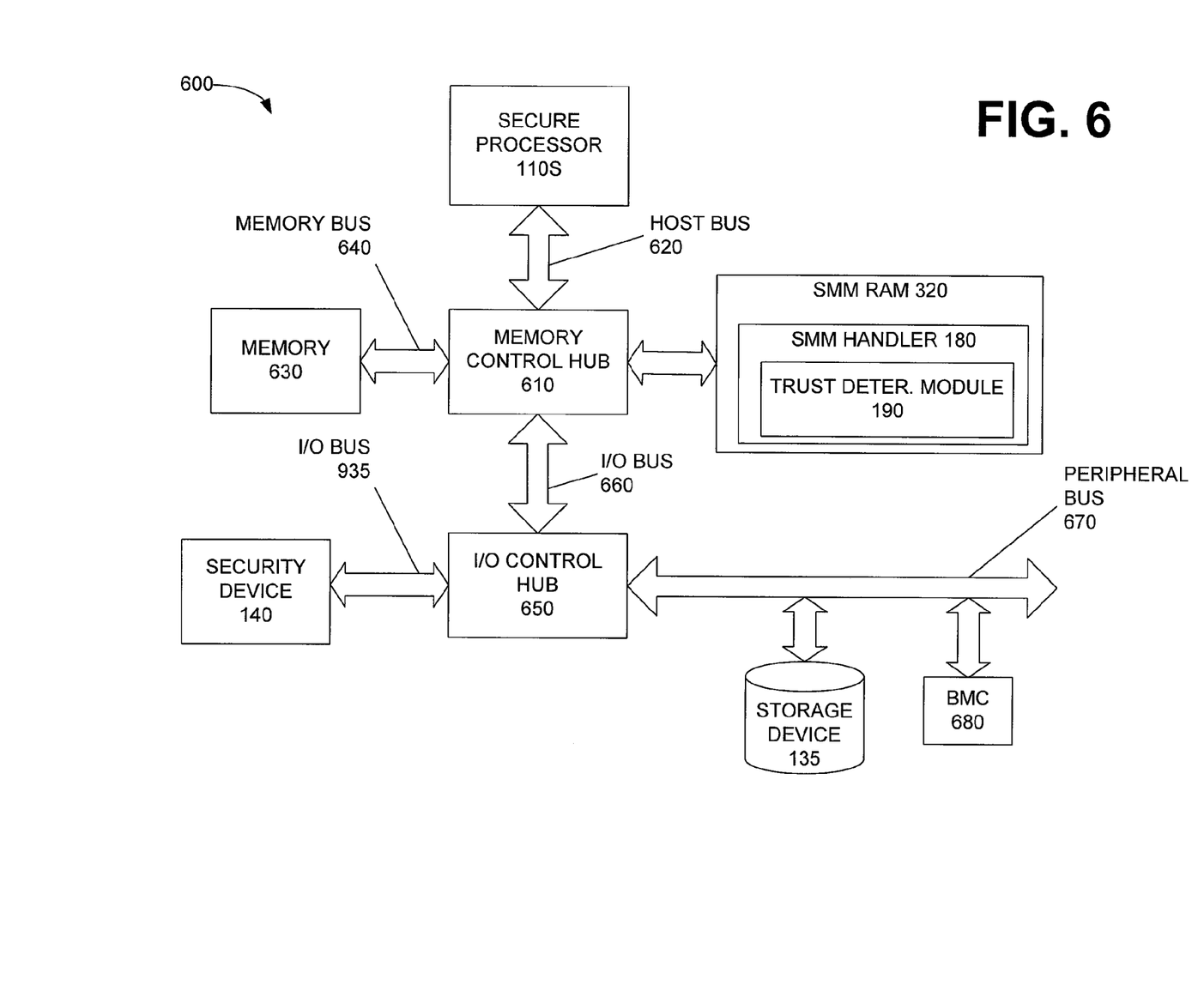
FIG. 6 is a block diagram showing selected components of another system which includes a module for securely invoking system management interrupts, according to some embodiments disclosed herein.

FIG. 6 is a block diagram showing selected components of another system which includes a module for determining a trust level from system management mode, according to some embodiments disclosed herein. Computing device 600, sometimes referred to as a trusted computing device 600, includes a secure processor 110S and security device 140. Security device 140, which is sometimes referred to as a trusted platform module (TPM), performs cryptographic functions, and may be used to store cryptographic keys, digital certificates, and passwords.

Secure processor 110S supports creation and management of multiple isolated execution environments, or partitions. Each of these isolated environments has dedicated resources (e.g., memory, processor state, etc.) that are managed by the processor, chipset, and OS kernel. In some embodiments, at least one of these partitions is a protected partition, where software can run in isolation, free from being observed or compromised by other software running on the platform.

In some embodiments of trusted computing device 600, secure processor 110S communicates with a memory control hub 610 over a host bus 620. Memory control hub 610 in turn interfaces to system memory 630 over a memory bus 640, and to an input/output (I/O) control hub 650 over an I/O bus 660. In some embodiments, hubs 610 and 650 are known as "host bridges", and in particular, memory control hub 610 may be referred to as a "North bridge" and I/O control hub 650 as a "South bridge". I/O control hub 650 interfaces to various peripheral devices over a peripheral bus 670, and to a baseboard management controller 680. Some embodiments of trusted computing device 600 also include a storage device 135 (e.g., a hard disk, flash RAM, flash ROM, or EEPROM).

In the context of this disclosure, a "computer-readable medium" can be any means that can contain or store the program for use by, or in connection with, the processor. The computer readable medium can be used in conjunction with a storage device, and can be (for example but not limited to) a medium that is based on magnetic, optical, electromagnetic, or semiconductor technology. Specific examples of a computer-readable medium using semiconductor technology would include (but are not limited to) the following: a random access memory (RAM); a read-only memory (ROM); an erasable programmable read-only memory (EPROM or Flash memory). A specific example using magnetic technology includes (but is not limited to) a computer disk or diskette. Specific examples using optical technology include (but are not limited to) a compact disk read-only memory (CD-ROM).

The flow charts herein provide examples of the operation of embodiments disclosed herein. Alternatively, these diagrams may be viewed as depicting actions of an example of a method implemented by module 700. Blocks in these diagrams represent procedures, functions, modules, or portions of code which include one or more executable instructions for implementing logical functions or steps in the process. Alternate embodiments are also included within the scope of the disclosure. In these alternate embodiments, functions may be executed out of order from that shown or discussed, including substantially concurrently or in reverse order, depending on the functionality involved. Not all steps are required in all embodiments.

The foregoing description has been presented for purposes of illustration and description. It is not intended to be exhaustive or to limit the invention to the precise forms disclosed. Obvious modifications or variations are possible in light of the above teachings. The embodiments discussed, however, were chosen and described to illustrate the principles of the invention and its practical application to thereby enable one of ordinary skill in the art to utilize the invention in various embodiments and with various modifications are suited as to the particular use contemplated. All such modifications and variation are within the scope of the invention as determined by the appended claims when interpreted in accordance with the breadth to which they are fairly and legally entitled.

What is claimed is:

1. A method comprising:
responsive to a system management mode interrupt (SMI), determining a trust level associated with code invoking the SMI; and
responsive to determining that the trust level is untrusted,
when a request made by the code invoking the SMI either does not require access to a cryptographic hardware device or is unrelated to the cryptographic hardware device, granting the request; and
when a request made by the code invoking the SMI either requires access to a cryptographic hardware device or is related to the cryptographic hardware device, blocking access to the cryptographic device and presenting a virtualization of access to the cryptographic device to the code invoking the SMI.

2. The method of claim 1, further comprising:
wherein the request is related to a hardware device other than the cryptographic hardware device.

3. The method of claim 1, wherein the cryptographic hardware device is implemented by a trusted platform module (TPM).

4. A computer system comprising:
system management mode (SMM) random access memory (RAM);
memory having instructions stored thereon; and
a hardware processor configured, by at least some of the instructions retrieved from the memory and executing on the processor, to respond to a system management mode interrupt (SMI) by:
determining a trust level associated with code invoking the SMI, based at least in part on trust invocation data stored in the SMM RAM; and
responsive to determining that the trust level is untrusted,
when a request made by the code invoking the SMI either does not require access to a cryptographic hardware device or is unrelated to the cryptographic device, granting the request; and
when a request made by the code invoking the SMI either requires access to a cryptographic hardware device or is related to the cryptographic hardware device, blocking access to the cryptographic device and presenting a virtualization of access to the cryptographic device to the code invoking the SMI.

5. The computer system of claim 4, wherein the cryptographic hardware device is implemented by a trusted platform module (TPM).

6. The computer system of claim 4, wherein the request is for other than access to cryptographic hardware.

7. A computer system comprising:
a processor having a plurality of modes including a system management mode (SMM) and another mode, the processor comprising:
a memory device including microcode, the microcode being operable to cause the processor to, in response to a system management interrupt (SMI):
switch the processor into the system management mode;
save, to a memory area that is mapped only in the system management mode, trust invocation data indicative of whether a trusted or an untrusted component was executing when the SMI occurred;
invoke a handler associated with the SMM; and
responsive to determining that the trust level is untrusted,
when a request made by the code invoking the SMI either does not require access to a cryptographic hardware device or is unrelated to the cryptographic hardware device, grant the request; and
when a request made by the code invoking the SMI either requires access to a cryptographic hardware device or is related to the cryptographic hardware device, block access to the cryptographic device and present a virtualization of access to the cryptographic device to the code invoking the SMI.

8. The system of claim 7, the system further comprising SMM random access memory (RAM) that implements the memory area that is mapped only in the system management mode.

9. The system of claim 7, the system further comprising:
SMI logic configured to generate the system management mode interrupt (SMI).

10. The system of claim 7, the system further comprising: a trusted platform module.

11. The system of claim 7, wherein the request is related to a hardware device other than the cryptographic hardware device.

* * * * *